United States Patent
Osawa et al.

(10) Patent No.: US 6,911,420 B2
(45) Date of Patent: Jun. 28, 2005

(54) METHOD OF REFINING A LUBRICANT FOR USE ON A MAGNETIC RECORDING MEDIUM

(75) Inventors: Yoshihito Osawa, Nagano (JP); Shinji Shirai, Nagano (JP); Masayuki Ishikawa, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 115 days.

(21) Appl. No.: 10/279,037

(22) Filed: Oct. 24, 2002

(65) Prior Publication Data

US 2003/0100454 A1 May 29, 2003

(30) Foreign Application Priority Data

Oct. 24, 2001 (JP) .......................................... 2001-326795

(51) Int. Cl.$^7$ .................. C10M 105/54; C10M 107/38; G11B 5/71
(52) U.S. Cl. .................. 508/111; 508/582; 428/65.4; 428/421; 428/694 TF
(58) Field of Search ......................................... 508/111

(56) References Cited

U.S. PATENT DOCUMENTS

| | | | |
|---|---|---|---|
| 6,099,937 A | * | 8/2000 | Gui et al. .................... 428/141 |
| 6,602,570 B1 | * | 8/2003 | Ma et al. .................... 428/65.4 |
| 6,645,634 B1 | * | 11/2003 | Shirai et al. ................. 428/421 |
| 6,670,309 B2 | * | 12/2003 | Chiba et al. ................. 508/111 |
| 6,673,429 B1 | * | 1/2004 | Ma et al. ..................... 428/216 |
| 6,740,414 B2 | * | 5/2004 | Yatsue ......................... 428/421 |

FOREIGN PATENT DOCUMENTS

| | | | |
|---|---|---|---|
| JP | 5-20673 | | 1/1993 |
| JP | 5-49806 | | 3/1993 |
| JP | 10-143838 | | 5/1998 |
| JP | 2001-164279 | * | 6/2001 |

* cited by examiner

Primary Examiner—Ellen M McAvoy

(57) ABSTRACT

A method to refine a lubricant on a magnetic recording medium includes a compound A including a perfluoropolyether molecular structure having two hydroxyl groups at each of two ends and a compound B including the perfluoropolyether molecular structure having one hydroxyl group at each of two ends. The method includes putting the lubricant into a pressure vessel set at a pressure and a temperature and removing the compound B dissolved in an extracting medium of a supercritical carbon dioxide fluid that flows at a predetermined rate through the pressure vessel held at a predetermined temperature and at a predetermined pressure. The method performs recovering the compound A dissolved in the extracting medium that flows through the pressure vessel held at the predetermined pressure and at a temperature lower than the predetermined temperature or at the predetermined temperature and at a pressure higher than the predetermined pressure.

23 Claims, No Drawings

METHOD OF REFINING A LUBRICANT FOR USE ON A MAGNETIC RECORDING MEDIUM

CROSS-REFERENCE TO RELATED APPLICATIONS

This application claims the benefit of Japanese Application No. 2001-326795, filed Oct. 24, 2001 in the Japanese Patent Office, the disclosure of which is incorporated herein by reference.

BACKGROUND OF THE INVENTION

1. Field of the Invention

The present invention relates to a method of refining a lubricant for use on a magnetic recording medium, the lubricant that is refined by the method, and a magnetic recording medium that uses the lubricant.

2. Description of the Related Art

A magnetic recording medium is commonly used in a fixed magnetic recording medium device as a data recording medium of a computer. The fixed magnetic recording medium device includes a driving mechanism of the magnetic recording medium, a driving mechanism of a magnetic head, a stopping mechanism of a magnetic head, a data transfer and control mechanism, and one or more magnetic recording media mounted on the magnetic recording medium device. Significant tendencies in the development of the fixed magnetic recording medium in recent years are high recording density, large capacity, and high data transfer speed.

In an operation scheme of a conventional fixed magnetic recording medium device, the magnetic head floats when the magnetic recording medium is rotating, and the magnetic head contacts with a surface of the magnetic recording medium when a driving motor to rotate the magnetic recording medium stops. The operation scheme is called a CSS (contact start and stop) scheme. When the magnetic recording medium begins to rotate and stops in the CSS scheme, the magnetic head slides and rubs with the surface of the magnetic recording medium. To protect the magnetic layer when rubbing with the surface of the magnetic recording medium, a protective layer is laminated, and to improve a surface lubrication performance, a lubricating film is laminated.

A rotating speed of the magnetic recording medium increases from about 5,400 rpm (revolutions per minute) to the range between 7,200 to 15,000 rpm. As a result, a spin migration phenomenon grows significantly, in which the lubricant on the magnetic recording medium surface moves towards an outer periphery due to a centrifugal force and scatters. A thickness increase of the lubricant in the peripheral region due to the spin migration causes a problem of sticking. Higher speed of rotation gives rise to heating, which causes evaporation of the lubricant. The evaporation of the lubricant decreases thickness of the lubricant, which may cause wear of the protective layer. A head crack may happen in a worst case.

In order to suppress the spin migration, the lubricant film is necessarily formed with a uniform thickness and with stability on a surface of the protective layer, and high adhesiveness and strong bonding between the lubricant film and the protective layer are important. The evaporation of the lubricant is also prevented by enhancement of the adhesiveness and bonding strength. To enhance the adhesiveness and bonding strength, a perfluoropolyether lubricant having an end group of hydroxyl group or piperonyl group is used. Examples of such lubricant are "Fomblin Z DOL" and "AM3001", which are commercially available from Ausimont K. K., Tokyo, Japan. Most of the perfluoropolyether lubricants used at present have an average molecular weight in the range between 1,000 and 10,000. If the molecular weight is too low, lubricating performance and heat resistance degrades; on the other hand, if the molecular weight is too high, adhesion tends to occur. However, these lubricants deteriorate durability to the spin migration at the high rotating speed in the range between 7,200 to 15,000 rpm, although the adhesiveness and bonding strength of the lubricant are enough at the rotating speed of about 5,400 rpm that is employed.

Accordingly, development is being made for a material having a functional group with strong polarity that is introduced into a perfluoropolyether lubricant in order to enhance adhesiveness and bonding. Japanese Unexamined Patent Application Publication Nos. H11-172268 and 2001-6155, for example, disclose that introduction of an amine end group significantly enhances bonding strength. Synthesis of these end-group-modified materials, however, requires long time and dedicated equipment, which arouses apprehension for increased cost for a manufacturer of the magnetic recording media to synthesize these materials.

Commercially available lubricant "Fomblin Z tetraol" from Ausimont K. K., Tokyo, Japan is a perfluoropolyether having a molecular structure in which two hydroxyl groups are introduced at each of the both ends. The lubricant is superior to "Fomblin Z DOL" from a viewpoint of the adhesiveness and bonding strength with the protective layer. The lubricant is known to contain a coexisting lubricant that has a structure including only one hydroxyl group at the end group. A structure including only one hydroxyl group at the end group is the structure of "Fomblin Z DOL". A coexistence of this lubricant component causes deterioration of adhesiveness and bonding strength from an expected performance.

Ionic impurities contained in the lubricant cause corrosion on the magnetic recording medium. The ionic impurities induce dissolution of cobalt used in a magnetic layer. The cobalt ions act as a catalyst and dissolve perfluoropolyether lubricant molecules. Therefore, the ionic impurities are to be eliminated as thoroughly as possible. However, because the lubricant inevitably contains ionic impurities that are used in the synthesis process of the perfluoropolyether lubricant, the ionic impurities must be removed before they are applied to the magnetic recording medium.

SUMMARY OF THE INVENTION

Various aspects and advantages of the invention will be set forth in part in the description that follows and, in part, will be obvious from the description, or may be learned by practice of the invention.

In order to suppress spin migration and evaporation of a lubricant of a magnetic recording medium at a high rotating speed of 7,200 to 15,000 rpm and at high temperature and high humidity of about 80° C. and 80% RH, for example, the lubricant is required to have high adhesiveness and strong bonding with a protective layer. Methods disclosed in Japanese Unexamined Patent Application Publication Nos. H11-172268 and 2001-6155 are insufficient in view of required time and costs.

In addition, a perfluoropolyether lubricant contains remaining ions that are used in the synthesis process of the perfluoropolyether. The ionic impurities must be removed before coating of the magnetic recording medium.

Accordingly, in accordance with an embodiment of the present invention, there is provided a method of refining a perfluoropolyether lubricant that has high adhesiveness and strong bonding with a protective layer, in order to provide a magnetic recording medium that exhibits excellent lubricating performance and long term stability even under high rotating speed and high temperature environment used in a fixed magnetic recording device.

In accordance with an embodiment of the present invention, there is provided a lubricant that is given high adhesiveness and strong bonding with a protective layer using the refining method. Still another object of an embodiment of the invention is to provide a magnetic recording medium that employs such a lubricant.

A first aspect of an embodiment of the present invention is a method of refining a lubricant that includes at least two types of compounds having different polarity. The method includes putting the lubricant into a pressure vessel in which pressure and temperature are set at predetermined values; removing a compound with weaker polarity dissolved in an extracting medium of supercritical carbon dioxide fluid that flows at a specified rate through the pressure vessel held at the predetermined temperature and pressure; and one of recovering a target compound dissolved in the extracting medium that flows through the pressure vessel at the predetermined pressure and at a temperature lower than the predetermined temperature, and recovering the target compound dissolved in the extracting medium that flows through the pressure vessel at the predetermined temperature and at a pressure higher than the predetermined pressure. The predetermined temperature may be in a range from 31° C. to 100° C. and the predetermined pressure may be in a range from 7.4 MPa to 30 MPa. For instance, the predetermined temperature is in the range from 40° C. to 100° C. For instance, the removing of the compound is conducted under a state at 60° C. and 15 MPa, and the recovering of the target compound is conducted under a state at 60° C. and 20 MPa.

Advantageously, the method of an embodiment of the present invention includes removing a lubricant B represented by formula (2) and recovering a lubricant A represented by formula (1);

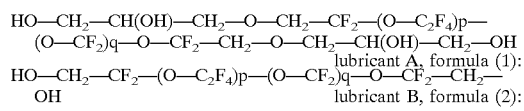

where p and q are positive integers.

A second aspect of an embodiment of the present invention is a lubricant for use on a magnetic recording medium being refined by the above-described method, in which ionic impurities are removed from the lubricant and the lubricant is sorted based on an end group structure of a perfluoropolyether molecule of the lubricant. The lubricant may be a mixture of the lubricant A having a molecular structure represented by the formula (1) and the lubricant B having a molecular structure represented by the formula (2). The lubricant may include B in an amount from zero to 10 molar percent with respect to a molar amount of the mixture of A and B.

A third aspect of an embodiment of the present invention is a magnetic recording medium using the refined lubricant as described above.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Hereinafter, embodiments of the present invention will be described in detail with reference to the attached drawings.

The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

A first aspect of an embodiment of the present invention will be first described.

The first aspect of an embodiment of the present invention is a method to refine a lubricant that contains at least a compound having two hydroxyl groups in each of the two end groups of a lubricant molecule and a compound having one hydroxyl group in each of the two end groups of the lubricant molecule. The method of the first aspect obtains a target lubricant by sorting the lubricant molecules based on a polarity of the end groups. The method uses an extracting fluid of a supercritical carbon dioxide and is based on the fact that solubility of a polar component into the supercritical carbon dioxide fluid is low at a relatively low pressure or at a relatively high temperature.

The method may use a vessel having a feed port and a vent port for the supercritical carbon dioxide fluid and equipment to control pressure and temperature in the vessel to a desired value, in order to refine the lubricant. The vessel and equipment to refine the lubricant may include, for example, a thick-wall stainless steel vessel having an inlet and an outlet, a pump to flow the supercritical carbon dioxide: SCF-Get manufactured by JASCO Corporation, Tokyo, Japan, a full automatic pressure regulator valve: SCF Bpg manufactured by JASCO Corporation, Tokyo, Japan, and a column oven used in usual chromatography. An extracting medium used is the supercritical carbon dioxide fluid, which is regulated at a temperature from 31° C. to 100° C. and a pressure from 7.4 MPa to 30 MPa. After pouring a lubricant material into the pressure vessel, the extracting medium of the supercritical carbon dioxide fluid is passed through the pressure vessel at a predetermined flow rate.

An extraction process is conducted while the supercritical carbon dioxide fluid is held in a state in which dissolving ability is low, that is, the pressure is relatively low and the temperature is relatively high, more specifically, in a state that exhibits dissolving ability for the lubricant equivalent to the ability at 60° C. and 15 MPa, for example. The extraction process extracts a component having a low molecular weight and a component having end groups of weak polarity, and those components are removed. Then, the extracting medium is flown at a predetermined rate. At this time, the supercritical carbon dioxide is held in a state in which a dissolving ability is high, that is, the temperature is lowered while a pressure in the pressure vessel is unchanged, or the pressure is raised while a temperature in the pressure vessel is unchanged. More specifically, the extracting fluid is held in a state that exhibits dissolving ability for the lubricant equivalent to the ability at 60° C. and 20 MPa, for example. A compound with stronger polarity dissolved in the extracting fluid at that state is recovered to obtain a refined target lubricant. The residue that is remained unextracted in the vessel includes a component with very strong polarity and a component with high molecular weight.

The refining in the method, according to an embodiment of the present invention, may be conducted at the temperature range from 31° C. to 100° C. and in a pressure range form 7.4 MPa to 30 MPa. In this range, the carbon dioxide is held in a supercritical state. A temperature range from 40° C. to 100° C. may be used. At the temperatures lower than 40° C., slight change of pressure makes large variation of the dissolving ability of the supercritical carbon dioxide fluid, which makes process control difficult. On the other hand, at the temperatures higher than 100° C., only by slightly raising the pressure, the dissolving ability of the supercritical carbon dioxide fluid varies, which makes the process control time consuming. The pressure condition is a secondary one that is determined by the determined temperature. In an exemplary embodiment, the removing process is conducted under the 60° C., 15 MPa condition, and the recovering process is conducted under the 60° C., 20 MPa condition.

A lubricant used in embodiments of the invention is a perfluoropolyether lubricant, and a specific example is "Fomblin Z tetraol" available from Ausimont K. K., Tokyo, Japan. "Fomblin Z tetraol" is a mixture of lubricant A having a molecular structure represented by formula (1) and lubricant B having a molecular structure represented by formula (2). Refining the "Fomblin Z tetraol" according to an embodiment of the present method allows to remove the lubricant B with a weak polarity and having only one hydroxyl group at each of the both ends and to recover the lubricant A with strong polarity and having two hydroxyl groups at each of the both ends as a target lubricant. The method provides a lubricant that contains 0 to 10 molar percent of lubricant B with respect to the mixture of the lubricants A and B.

A second aspect of an embodiment of the present invention will be now described.

The second aspect of an embodiment of the present invention is a lubricant of the magnetic recording medium refined by the above-described method. In particular, the lubricant includes an enhanced concentration of a high polarity component by sorting the perfluoropolyether molecule of the lubricant based on end group structure. Ionic impurities are removed from the lubricant.

The lubricant according to an embodiment of the present invention is refined to become a composition having the end group structure with higher polarity. Thus, adhesiveness and bonding strength with the protective layer are enhanced, leading to suppress spin migration and thermal evaporation.

Because ionic impurities that may cause decomposition of the lubricant are removed from the lubricant, stability of the lubricant is held during a long term use by restraint of the decomposition. The ionic impurities that may be contained in the original lubricant include $Na^+$, $K^+$, $Cl^-$, $SO_4^{2-}$, and $HSO_4^-$.

A third aspect of an embodiment of the present invention will be described below.

The third aspect of an embodiment of the invention is a magnetic recording medium using the refined lubricant described above. The magnetic recording medium according to an embodiment of the present invention is produced by laminating the lubricant on the magnetic recording medium that is fabricated by sequentially depositing a nonmagnetic metal underlayer, a magnetic layer, and a protective layer on a substrate. Each of the underlayer, the magnetic layer, and the protective layer can be deposited by a sputtering method or a CVD method. The lubricant can be applied by a known dip-coating method. The sputtering method, the CVD method, and the dip-coating method may be conducted using generally used equipment.

Materials for use in the magnetic recording medium of an embodiment of the present invention includes: an aluminum alloy substrate, a glass substrate, and a plastic substrate, a nonmagnetic underlayer of plated or sputtered NiP or NiAl, a magnetic layer containing Co, Cr, Ta, or Pt, and a nitrogen-added amorphous carbon (a-C:N) protective layer, and a diamond-like carbon (DLC) protective layer.

To enhance adhesiveness with the protective layer, heating or UV irradiation may be conducted before or after lubricant application. An additive, for example, a cyclophosphazene compound, may be added to the lubricant.

Because the lubricant, according to an embodiment of the present invention, exhibits high adhesiveness and strong bonding with the protective layer and shows stability in long term use, the magnetic recording medium using the lubricant hardly brings about spin migration even under a condition of high rotating speed. Wear of the protective layer is minute because evaporation of the lubricant by heating is little.

The present invention will be described more in detail with reference to some exemplary embodiments.

EXAMPLE 1

Forty grams of "Fomblin Z tetraol" (hereinafter simply referred to as Z-tetraol) supplied from Ausimont K. K., Tokyo, Japan, for instance, is poured into a thick-walled stainless steel vessel with an inner diameter of 20 mm and a length of 250 mm having an inlet and an outlet, and a supercritical carbon dioxide fluid is flown at a flow rate of 10 m liter/minute. Then, the temperature is held at 60° C. and the pressure is varied with time. Separating at each pressure step, extracted components 60-1 to 60-10 are obtained, as shown in Table 1. In this example of embodiments, the used equipment includes a liquid pump to feed the supercritical carbon dioxide fluid, of, for instance, SCF-Get manufactured by JASCO Corporation, Tokyo, Japan, a full automatic pressure regulator valve, SCF-Bpg manufactured by JASCO Corporation, Tokyo, Japan, and a column oven used in a usual chromatography.

TABLE 1

Extracted weight of Z-tetraol at 60° C.

| Component | Pressure [Mpa] | Time [min] | Weight [g] |
|---|---|---|---|
| 60-1 | 10.0 11.0 11.5 12.0 12.5 13.0 | 7 5 5 5 5 20 | 3.51 |
| 60-2 | 14.0 | 20 | 4.12 |
| 60-3 | 15.0 | 20 | 5.38 |
| 60-4 | 16.0 | 20 | 7.27 |
| 60-5 | 17.0 | 20 | 6.40 |
| 60-6 | 18.0 | 20 | 4.31 |
| 60-7 | 19.0 20.0 | 10 10 | 3.01 |
| 60-8 | 22.0 24.0 26.0 | 10 5 5 | 2.25 |
| 60-9 | 28.0 30.0 | 10 20 | 2.25 |
| 60-10 | Residue | — | 1.03 |
| | | total | 39.53 |

EXAMPLE 2

Forty grams of the lubricant Z-tetraol is poured into a thick-wall stainless steel vessel having an inlet and an outlet with an inner diameter of 20 mm and a length of 250 mm, and supercritical carbon dioxide is flown at a flow rate of 10 ml/min. Then, the temperature is held at 100° C. and the pressure is varied with time. Separating at each pressure step, the following extracted components 100-1 to 100-11 are obtained, as shown in Table 2. In this example of embodiments, the used equipment is the same as the one used in Example 1.

TABLE 2

Extracted weight of Z-tetraol at 100° C.

| Component | Pressure [Mpa] | Time [min] | Weight [g] |
|---|---|---|---|
| 100-1 | 10.0 11.0 12.0 13.0 14.0 15.0 16.0 17.0 18.0 | 5 5 5 5 5 5 5 5 5 | 0.78 |

TABLE 2-continued

Extracted weight of Z-tetraol at 100° C.

| Component | Pressure [Mpa] | Time [min] | Weight [g] |
|---|---|---|---|
| 100-2 | 19.0 | 20 | 2.31 |
| 100-3 | 20.0 | 20 | 3.32 |
| 100-4 | 21.0 | 20 | 4.24 |
| 100-5 | 22.0 | 20 | 6.27 |
| 100-6 | 23.0 | 20 | 7.32 |
| 100-7 | 24.0 | 20 | 6.80 |
| 100-8 | 25.0 | 20 | 3.41 |
| 100-9 | 26.0 | 20 | 1.76 |
| 100-10 | 27.0 30.0 | 3 20 | 1.45 |
| 100-11 | residue | — | 0.71 |
| | | total | 38.36 |

1. Testing of Solubility into a Solvent

Each component extracted in Example 1 and Example 2 are tested on solubility into a solvent that is generally used in a lubricant coating process, having chemical formula $C_5F_{10}H_2$ and the trade name Vertrel XF, available from Mitsui-Dupont fluoro-chemical Co., Ltd. Each extracted component and the solvent are mixed so that a concentration of the component is 1 weight percent. Solubility is confirmed by visual observation.

A slight amount of unsolved precipitate is observed in an unrefined lubricant material. Precipitate is also observed in components 60-9, 60-10, 100-10, and 100-11. All other extracted components are dissolved including from 60-1 to 60-8 and from 100-1 to 100-9.

2. NMR Measurement

Molar compositions of lubricant A and lubricant B are measured for the components 60-1 to 60-10 using F19-NMR. The results are shown in Table 3.

TABLE 3

Mixing ratio of lubricants for the components extracted at 60° C.

| Component | Lubricant A (%) | Lubricant B (%) |
|---|---|---|
| 60-1 | 63 | 37 |
| 60-2 | 70 | 30 |
| 60-3 | 82 | 18 |
| 60-4 | 87 | 13 |
| 60-5 | 94 | 6 |
| 60-6 | 95 | 5 |
| 60-7 | 100 | 0 |
| 60-8 | 100 | 0 |
| 60-9 | 100 | 0 |
| 60-10 | 100 | 0 |

A structure of the lubricant B is more contained in the components extracted at lower pressures. A content of the lubricant A can be increased by removing the components extracted at lower pressure. A dissolving ability of the supercritical carbon dioxide fluid for a polar component is known to decrease in conditions of temperature and pressure at which a density of the supercritical carbon dioxide fluid is low. The lubricant B exhibits weaker polarity because it has fewer hydroxyl groups per molecule as compared with the lubricant A. Therefore, the lubricant B is predominantly dissolved into the supercritical carbon dioxide fluid at a relatively low pressure.

Under the same pressure conditions, the density of the supercritical carbon dioxide fluid decreases at higher temperatures. When extraction process is conducted at 100° C. in place of 60° C., the dissolving ability of the fluid for a polar component is lower at the same pressure. Therefore, it is understood that higher pressure is generally required to dissolve the same amount of lubricant at 100° C. than at 60° C.

3. Measurement of Ionic Impurities

Several microgram of unrefined material and each of the extracted components 60-1 to 60-10 and 100-1 to 100-11 are dropped on a surface of the magnetic recording medium uncoated with lubricant. A quantity of each kind of ions on the surface are measured using TOF-SIMS. The results are given in Table 4. Numerical values in Table 4 are a detected quantity that is a number of counts per unit time in the TOF-SIMS.

The results show that cations are frequently detected in the component extracted at higher pressures and a residue after extraction. $HCO_3$ and $HSO_4$ are frequently detected in the residue. Chromiums are detected in the component extracted at high pressure side and also in the low pressure extraction components 60-1, 2, 3 and 100-1, 2, 3, 4. In the 60-1, 2, 3 and 100-1, 2, 3, 4, $CF_2Cl$ is at the same time detected. But, the $CF_2Cl$ is not detected in the high pressure extraction components and the residue. Ionic impurities, which are components with fairly strong polarity, either slightly dissolve in a relatively low temperature and high pressure state, or do not dissolve in the fluid at a pressure of up to 30 MPa leaving in a residue. Consequently, it can be understood that those components may be removed together with the residue in a refinement using supercritical carbon dioxide fluid as an extraction medium.

Chromium is detected in low pressure components, as well, which are supposed to not be present in the form of ions because $CF_2Cl$ is detected by close observation of fragments of the TOF-SIMS, which may indicate that the extracted molecules are impurities having end group of —$CF_2Cl$ in place of —$CH_2OH$ in the lubricant B.

TABLE 4

Number of counts for each type of ions detected using TOF-SIMS

| | component | | | | |
|---|---|---|---|---|---|
| | cation | | anion | | |
| | K | Na | Cl | $HCO_3$ | $HSO_4$ |
| unrefined | 45684 | 925 | 1793 | 57 | 462 |
| 60-1 | 304 | 56 | 3110 | 11 | 20 |
| 60-2 | 220 | 42 | 2040 | 3 | 39 |
| 60-3 | 171 | 20 | 1381 | 5 | 19 |
| 60-4 | 136 | 14 | 289 | 3 | 24 |
| 60-5 | 214 | 24 | 144 | 14 | 36 |
| 60-6 | 425 | 22 | 259 | 4 | 34 |
| 60-7 | 1211 | 51 | 193 | 9 | 21 |
| 60-8 | 6154 | 190 | 264 | 7 | 42 |
| 60-9 | 7157 | 333 | 519 | 15 | 74 |
| 60-10 | 107611 | 3269 | 2236 | 115 | 353 |
| 100-1 | 7261 | 215 | 5399 | 15 | 79 |
| 100-2 | 736 | 40 | 3544 | 5 | 18 |
| 100-3 | 350 | 16 | 2624 | 4 | 17 |
| 100-4 | 433 | 32 | 2154 | 7 | 25 |
| 100-5 | 552 | 20 | 937 | 2 | 23 |
| 100-6 | 531 | 15 | 340 | 4 | 27 |
| 100-7 | 349 | 7 | 263 | 0 | 25 |
| 100-8 | 837 | 19 | 261 | 5 | 25 |
| 100-9 | 1563 | 28 | 204 | 6 | 21 |
| 100-10 | 4574 | 69 | 455 | 12 | 40 |
| 100-11 | 102855 | 4584 | 2060 | 161 | 452 |

4. Bonded Ratio in a Lubricant Film and Loss by Heating

A nonmagnetic substrate of aluminum-magnesium alloy is prepared. After forming the nonmagnetic layer by plating Ni—P using electroless plating, the surface is polished. Nearly concentric circular grooves are made having a surface roughness Ra of 0.8 nm using texturing using diamond slurry. After cleaning the substrate, a nonmagnetic metal underlayer of chromium is formed in a commonly used sputtering apparatus. Subsequently, a magnetic layer containing Co, Cr, Ta, and Pt and a protective layer of nitrogen-added amorphous carbon (a-C:N) having thickness of 8 nm are formed by the CVD method. The nonmagnetic substrate is employed as a common medium. Each of the common media is coated with unrefined Z-tetraol or each of the extracted components 60-1 to 60-9. The coating is conducted by a dipping method using a solution including 0.06 wt % of the extracted lubricant in a solvent of Vertrel XF. Speed of pulling-up is controlled between 0.5 and 3 mm/s so as to adjust a thickness of the lubricant film to 2.4 nm. The thickness of the lubricant film is measured on the produced samples using an FT-IR method. Then, a mobile component of the lubricant film is removed using fluorine-containing solvent. The thickness of the left component of the lubricant film is measured as a bonded component of the lubricant film. Bonded ratio of the lubricant film is defined by the thickness of the bonded component of the lubricant film divided by the total thickness of the lubricant film.

Each magnetic recording medium is heated at 140° C. for 60 minutes, and the film thickness is measured after the heating to obtain a loss by heating. Those values are given in Table 5.

The components that include relatively large quantity of the lubricant B exhibited low bonded ratio, and the bonded ratio increased as the quantity of the lubricant B decreased. The loss by heating showed similar tendency.

TABLE 5

Bonded ratio on a magnetic recording medium and loss by heating

| Component | Bonded ratio (%) | Loss by heating (nm) |
|---|---|---|
| Unrefined | 40.4 | −0.51 |
| 60-1 | 31.5 | −0.74 |
| 60-2 | 33.3 | −0.54 |
| 60-3 | 32.5 | −0.30 |
| 60-4 | 37.0 | −0.28 |
| 60-5 | 42.6 | −0.24 |
| 60-6 | 46.9 | −0.26 |
| 60-7 | 50.6 | −0.23 |
| 60-8 | 54.1 | −0.10 |
| 60-9 | 53.5 | −0.04 |

EXAMPLE 3

Forty grams of the lubricant Z-tetraol is poured into a thick-wall stainless steel vessel having an inlet and an outlet with an inner diameter of 20 mm and a length of 250 mm, and supercritical carbon dioxide fluid is flown at a flow rate of 10 mL/min. A component dissolved in the fluid at 60° C. and 15 MPa during 60 minutes is removed. From the left residue, the component dissolved in the fluid at 60° C. and 20 MPa flown at the flow rate of 10 mL/min for 40 minutes is recovered to obtain 20 g of a material for the lubricant. In this Example, the same equipment as the one used in Example 1 is used.

A molar composition of the lubricant A and B in the obtained lubricant is measured by using an NMR and resulted in A: 91% and B: 9%. The magnetic recording medium having a lubricant film 2.4 nm thick is produced using this lubricant. Bonded ratio and loss by heating are measured resulting in bonded ratio of 45% and the loss by heating of 0.25 nm. A quantity of each kind of ions present on the completed magnetic recording medium is measured by using a TOF-SIMS. All of Na, K, Cl, $HCO_3$, and $HSO_4$ decreased to less than 10% with respect to those of the magnetic recording medium using unrefined lubricant.

As described above, by employing a lubricant in which a bonded ratio is enhanced, a loss by heating is suppressed, and ionic impurities are decreased. Thus, a magnetic recording medium can be provided that exhibits excellent lubricating performance and stability during long term use at a high rotating speed and at a high temperature of the magnetic recording medium mounted on a fixed magnetic recording device.

The various features and advantages of the invention are apparent from the detailed specification and, thus, it is intended by the appended claims to cover such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to refine a lubricant including a compound A having a perfluoropolyether molecular structure that has two hydroxyl groups at each of two ends of compound A, and a compound B having the perfluoropolyether molecular structure that has one hydroxyl group at each of two ends of compound B, the method comprising:

placing the lubricant into a pressure vessel set at a predetermined pressure and at a predetermined temperature;

removing the compound B by a process comprising:
flowing an extracting medium of a supercritical carbon dioxide fluid at a predetermined rate through the pressure vessel,
holding the pressure vessel at the predetermined temperature and the predetermined pressure,
dissolving the compound B in the supercritical carbon dioxide fluid, and
removing the dissolved compound B from the pressure vessel; and recovering the compound A by a process comprising:
flowing the extracting medium of the supercritical carbon dioxide fluid through the pressure vessel,
holding the pressure vessel at the predetermined pressure and at a temperature lower than the predetermined temperature,
dissolving the compound A in the extracting medium, and
recovering the dissolved compound A from the pressure vessel.

2. The method to refine a lubricant as recited in claim 1, wherein the predetermined temperature is in a range from 31° C. to 100° C. and the predetermined pressure is in a range from 7.4 MPa to 30 MPa.

3. The method to refine a lubricant as recited in claim 2, wherein the predetermined temperature is in a range from 40° C. to 100° C.

4. The method to refine a lubricant as recited in claim 1, wherein the compound A is a lubricant A represented by formula (1) and the compound B is a lubricant B represented by formula (2);

HO—$CH_2$—CH(OH)—$CH_2$—O—$CH_2$—$CF_2$—(O—$C_2F_4$)p—(O—$CF_2$)q—O—$CF_2$—$CH_2$—O—$CH_2$—CH(OH)—$CH_2$—OH lubricant A, formula (1):

HO—$CH_2$—$CF_2$—(O—$C_2F_4$)p—(O—$CF_2$)q—O—$CF_2$—$CH_2$—OH, lubricant B, formula (2):

where p and q are positive integers.

5. A method to refine a lubricant including a compound A having a perfluoropolyether molecular structure that has two hydroxyl groups at each of two ends of compound A, and a compound B having the perfluoropolyether molecular structure that has one hydroxyl group at each of two ends of compound B, the method comprising:

placing the lubricant into a pressure vessel set at a predetermined pressure and at a predetermined temperature;

removing the compound B by a process comprising:

flowing an extracting medium of a supercritical carbon dioxide fluid at a predetermined rate through the pressure vessel, holding the pressure vessel at the predetermined temperature and at the predetermined pressure, dissolving the compound B in the supercritical carbon dioxide fluid, and removing the dissolved compound B from the pressure vessel; and recovering the compound A by a process comprising:

flowing the extracting medium of the supercritical carbon dioxide fluid through the pressure vessel, holding the pressure vessel at the predetermined temperature and at a pressure higher than the predetermined pressure, dissolving the compound A in the supercritical carbon dioxide fluid, and recovering the dissolved compound A from the pressure vessel.

6. The method to refine a lubricant as recited in claim 5, wherein the predetermined temperature is in a range from 31° C. to 100° C. and the predetermined pressure is in a range from 7.4 MPa to 30 MPa.

7. The method to refine a lubricant as recited in claim 6, wherein the predetermined temperature is in a range from 40° C. to 100° C.

8. The method to refine a lubricant as recited in claim 5, wherein the removing of the compound B comprises removing a component that is dissolved in the supercritical carbon dioxide fluid under a state at 60° C. and 15 Mpa.

9. The method to refine a lubricant as recited in claim 5, wherein the recovering of the compound A comprises recovering a component that is dissolved in the supercritical carbon dioxide fluid under a state at 60° C. and 20 MPa.

10. The method to refine a lubricant as recited in claim 5, wherein the compound A is a lubricant A represented by formula (1) and the compound B is a lubricant B represented by formula (2),

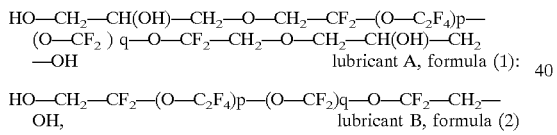

where p and q are positive integers.

11. The method to refine a lubricant as recited in claim 5, wherein the lubricant is a mixture of a lubricant A having a molecular structure represented by a formula (1) and a lubricant B having a molecular structure represented by a formula (2), the mixture comprising the lubricant B in an amount from zero to 10 molar percent with respect a molar amount of the mixture of the lubricants A and B,

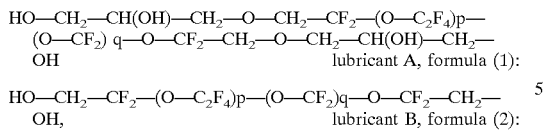

where p and q are positive integers.

12. A lubricant of a magnetic recording medium, comprising:

a compound A comprising a perfluoropolyether molecular structure having two hydroxyl groups at each of two ends of compound A; and a compound B comprising the perfluoropolyether molecular structure having one hydroxyl group at each of two ends of compound B, wherein the lubricant is refined by placing the lubricant into a pressure vessel set at a predetermined pressure and a predetermined temperature, removing the compound B by a process comprising:

flowing an extracting medium of a supercritical carbon dioxide fluid at a predetermined rate through the pressure vessel, holding the pressure vessel at the predetermined temperature and at the predetermined pressure, dissolving the compound B in the supercritical carbon dioxide fluid, and removing the dissolved compound B from the pressure vessel, and recovering the compound A by a process comprising:

flowing the extracting medium of the supercritical carbon dioxide fluid through the pressure vessel, holding the pressure vessel at the predetermined pressure and at a temperature lower than the predetermined temperature, dissolving the compound A in the supercritical carbon dioxide fluid, and recovering the dissolved compound A from the pressure vessel.

13. The lubricant of the magnetic recording medium as recited in claim 12, wherein the lubricant is a mixture of a lubricant A having a molecular structure represented by a formula (1) and a lubricant B having a molecular structure represented by a formula (2), the mixture comprising the lubricant B in an amount from zero to 10 molar percent with respect a molar amount of the mixture of the lubricants A and B:

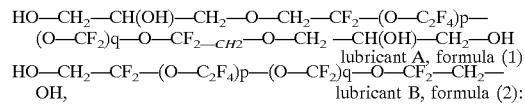

where p and q are positive integers.

14. A magnetic recording medium using a lubricant, the lubricant comprising:

a compound A comprising a perfluoropolyether molecular structure having two hydroxyl groups at each of two ends of compound A; and a compound B comprising the perfluoropolyether molecular structure having one hydroxyl group at each of two ends of compound B, wherein the lubricant is refined by placing the lubricant into a pressure vessel set at a predetermined pressure and at a predetermined temperature, removing the compound B by a process comprising:

flowing an extracting medium of a supercritical carbon dioxide fluid at a predetermined rate through the pressure vessel, holding the pressure vessel at the predetermined temperature and at the predetermined pressure, dissolving the compound B in the supercritical carbon dioxide fluid, and removing the dissolved compound B from the pressure vessel, and recovering the compound A by a process comprising:

flowing the extracting medium of the supercritical carbon dioxide fluid through the pressure vessel, holding the pressure vessel at the predetermined pressure and at a temperature lower than the predetermined temperature, dissolving the compound A in the supercritical carbon dioxide fluid, and recovering the dissolved compound A from the pressure vessel.

15. The magnetic recording medium as recited in claim 14, wherein the lubricant is a mixture of a lubricant A having a molecular structure represented by a formula (1) and a lubricant B having a molecular structure represented by a formula (2), the mixture comprising the lubricant B in an amount from zero to 10 molar percent with respect a molar amount of the mixture of the lubricants A and B:

HO—CH$_2$—CH(OH)—CH$_2$—O—CH$_2$—CF$_2$—(O—C$_2$F$_4$)p—(O—CF$_2$)q—O—CF$_2$—CH$_2$—O—CH$_2$—CH(OH)—CH$_2$—OH
                                                                                                        lubricant A, formula (1):

HO—CH$_2$—CF$_2$—(O—C$_2$F$_4$)p—(O—CF$_2$)q—O—CF$_2$—CH$_2$—OH,    lubricant B, formula (2):

where p and q are positive integers.

16. A lubricant of a magnetic recording medium, comprising:
a compound A comprising a perfluoropolyether molecular structure having two hydroxyl groups at each of two ends of compound A; and
a compound B comprising the perfluoropolyether molecular structure having one hydroxyl group at each of two ends of compound B, wherein the lubricant is refined by
placing the lubricant into a pressure vessel set at a predetermined pressure and at a predetermined temperature,
removing the compound B by a process comprising:
flowing an extracting medium of a supercritical carbon dioxide fluid at a predetermined rate through the pressure vessel,
holding the pressure vessel at the predetermined temperature and at the predetermined pressure,
dissolving the compound B in the supercritical carbon dioxide fluid, and
removing the dissolved compound B from the pressure vessel, and recovering the compound A by a process comprising:
flowing the extracting medium of the supercritical carbon dioxide fluid through the pressure vessel,
holding the pressure vessel at the predetermined temperature and at a pressure higher than the predetermined pressure
dissolving the compound A in the extracting medium, and
recovering the dissolved compound A from the pressure vessel.

17. The lubricant of the magnetic recording medium as recited in claim 16, wherein the lubricant is a mixture of a lubricant A having a molecular structure represented by a formula (1) and a lubricant B having a molecular structure represented by a formula (2), the mixture comprising the lubricant B in an amount from zero to 10 molar percent with respect a molar amount of the mixture of the lubricants A and B:

HO—CH$_2$—CH(OH)—CH$_2$—O—CH$_2$—CF$_2$—(O—C$_2$F$_4$)p—(O—CF$_2$)q—O—CF$_2$—CH$_2$—O—CH$_2$—CH(OH)—CH$_2$—OH   lubricant A, formula (1):

HO—CH$_2$—CF$_2$—(O—C$_2$F$_4$)p—(O—CF$_2$)q—O—CF$_2$—CH$_2$—OH,    lubricant B, formula (2):

where p and q are positive integers.

18. The lubricant of the magnetic recording medium as recited in claim 16, wherein the predetermined temperature is in a range from 31° C. to 100° C. and the predetermined pressure is in a range from 7.4 MPa to 30 MPa.

19. The lubricant of the magnetic recording medium as recited in claim 18, wherein the predetermined temperature is in a range from 40° C. to 100° C.

20. A magnetic recording medium using a lubricant, the lubricant comprising:
a compound A comprising a perfluoropolyether molecular structure having two hydroxyl groups at each of two ends of compound A; and
a compound B comprising the perfluoropolyether molecular structure having one hydroxyl group at each of two ends of compound B, wherein the lubricant is refined by
placing the lubricant into a pressure vessel set at a predetermined pressure and at a predetermined temperature,
removing the compound B by a process comprising:
flowing an extracting medium of a supercritical carbon dioxide fluid at a predetermined rate through the pressure vessel,
holding the pressure vessel at the predetermined temperature and at the predetermined pressure,
dissolving the compound B in the supercritical carbon dioxide fluid, and
removing the dissolved compound B from the pressure vessel, and
recovering the compound A by a process comprising:
flowing the extracting medium of the supercritical carbon dioxide fluid through the pressure vessel,
holding the pressure vessel held at the predetermined temperature and at a pressure higher than the predetermined pressure,
dissolving the compound A in the supercritical carbon dioxide fluid, and
recovering the dissolved compound A from the pressure vessel.

21. The magnetic recording medium as recited in claim 20, wherein the lubricant is a mixture of a lubricant A having a molecular structure represented by a formula (1) and a lubricant B having a molecular structure represented by a formula (2), the mixture comprising the lubricant B in an amount from zero to 10 molar percent with respect a molar amount of the mixture of the lubricants A and B:

HO—CH$_2$—CH(OH)—CH$_2$—O—CH$_2$—CF$_2$—(O—C$_2$F$_4$)p—(O—CF$_2$)q—O—CF$_2$—CH$_2$—O—CH$_2$—CH(OH)—CH$_2$—OH   lubricant A, formula (1)

HO—CH$_2$—CF$_2$—(O—C$_2$F$_4$)p—(O—CF$_2$)q—O—CF$_2$—CH$_2$—OH,    lubricant B, formula (2)

where p and q are positive integers.

22. The magnetic recording medium as recited in claim 20, wherein the predetermined temperature is in a range from 31° C. to 100° C. and the predetermined pressure is in a range from 7.4 MPa to 30 MPa.

23. The magnetic recording medium as recited in claim 22, wherein the predetermined temperature is in a range from 40° C. to 100° C.

* * * * *

UNITED STATES PATENT AND TRADEMARK OFFICE
CERTIFICATE OF CORRECTION

PATENT NO. : 6,911,420 B2
APPLICATION NO. : 10/279037
DATED : June 28, 2005
INVENTOR(S) : Yoshihito Osawa et al.

It is certified that error appears in the above-identified patent and that said Letters Patent is hereby corrected as shown below:

Column 10, Lines 52-56, delete
"HO-CH$_2$-CH(OH)-CH$_2$-O-CH$_2$-CF$_2$-(O-C$_2$F$_4$)p-(O-CF$_2$)q-O-CF$_2$-CH$_2$-O-CH$_2$-CH(OH)-CH$_2$-OH
lubricant A, formula (1):
HO-CH$_2$- CF$_2$-(O-C$_2$F$_4$)p-(O-CF$_2$)q-O-CF$_2$-CH$_2$- OH,
lubricant B, formula (2):" and insert
--lubricant A, formula (1):
HO-CH$_2$-CH(OH)-CH$_2$-O-CH$_2$-CF$_2$-(O-C$_2$F$_4$)p-(O-CF$_2$)q-O-CF$_2$-CH$_2$-O-CH$_2$-CH(OH)-CH$_2$-OH
lubricant B, formula (2):
HO-CH$_2$- CF$_2$-(O-C$_2$F$_4$)p-(O-CF$_2$)q-O-CF$_2$-CH$_2$- OH,-- therefor.

Column 11, Lines 38-43, delete
"HO-CH$_2$-CH(OH)-CH$_2$-O-CH$_2$-CF$_2$-(O-C$_2$F$_4$)p-(O-CF$_2$)q-O-CF$_2$-CH$_2$-O-CH$_2$-CH(OH)-CH$_2$-OH
lubricant A, formula (1):
HO-CH$_2$- CF$_2$-(O-C$_2$F$_4$)p-(O-CF$_2$)q-O-CF$_2$-CH$_2$- OH,
lubricant B, formula (2):" and insert
--lubricant A, formula (1):
HO-CH$_2$-CH(OH)-CH$_2$-O-CH$_2$-CF$_2$-(O-C$_2$F$_4$)p-(O-CF$_2$)q-O-CF$_2$-CH$_2$-O-CH$_2$-CH(OH)-CH$_2$-OH
lubricant B, formula (2):
HO-CH$_2$- CF$_2$-(O-C$_2$F$_4$)p-(O-CF$_2$)q-O-CF$_2$-CH$_2$- OH,-- therefor.

Column 11, Lines 52-57, delete
"HO-CH$_2$-CH(OH)-CH$_2$-O-CH$_2$-CF$_2$-(O-C$_2$F$_4$)p-(O-CF$_2$)q-O-CF$_2$-CH$_2$-O-CH$_2$-CH(OH)-CH$_2$-OH
lubricant A, formula (1):
HO-CH$_2$- CF$_2$-(O-C$_2$F$_4$)p-(O-CF$_2$)q-O-CF$_2$-CH$_2$- OH,
lubricant B, formula (2):" and insert
--lubricant A, formula (1):
HO-CH$_2$-CH(OH)-CH$_2$-O-CH$_2$-CF$_2$-(O-C$_2$F$_4$)p-(O-CF$_2$)q-O-CF$_2$-CH$_2$-O-CH$_2$-CH(OH)-CH$_2$-OH
lubricant B, formula (2):
HO-CH$_2$- CF$_2$-(O-C$_2$F$_4$)p-(O-CF$_2$)q-O-CF$_2$-CH$_2$- OH,-- therefor.

UNITED STATES PATENT AND TRADEMARK OFFICE
CERTIFICATE OF CORRECTION

PATENT NO. : 6,911,420 B2
APPLICATION NO. : 10/279037
DATED : June 28, 2005
INVENTOR(S) : Yoshihito Osawa et al.

It is certified that error appears in the above-identified patent and that said Letters Patent is hereby corrected as shown below:

Column 12, Lines 31-35, delete
"HO-$CH_2$-CH(OH)-$CH_2$-O-$CH_2$-$CF_2$-(O-$C_2F_4$)p-(O-$CF_2$)q-O-$CF_2$-$CH_2$-O-$CH_2$-CH(OH)-$CH_2$-OH
lubricant A, formula (1):
HO-$CH_2$- $CF_2$-(O-$C_2F_4$)p-(O-$CF_2$)q-O-$CF_2$-$CH_2$- OH,
lubricant B, formula (2):" and insert
--lubricant A, formula (1):
HO-$CH_2$-CH(OH)-$CH_2$-O-$CH_2$-$CF_2$-(O-$C_2F_4$)p-(O-$CF_2$)q-O-$CF_2$-$CH_2$-O-$CH_2$-CH(OH)-$CH_2$-OH
lubricant B, formula (2):
HO-$CH_2$- $CF_2$-(O-$C_2F_4$)p-(O-$CF_2$)q-O-$CF_2$-$CH_2$- OH,-- therefor.

Column 13, Lines 8-13, delete
"HO-$CH_2$-CH(OH)-$CH_2$-O-$CH_2$-$CF_2$-(O-$C_2F_4$)p-(O-$CF_2$)q-O-$CF_2$-$CH_2$-O-$CH_2$-CH(OH)-$CH_2$-OH
lubricant A, formula (1):
HO-$CH_2$- $CF_2$-(O-$C_2F_4$)p-(O-$CF_2$)q-O-$CF_2$-$CH_2$- OH,
lubricant B, formula (2):" and insert
--lubricant A, formula (1):
HO-$CH_2$-CH(OH)-$CH_2$-O-$CH_2$-$CF_2$-(O-$C_2F_4$)p-(O-$CF_2$)q-O-$CF_2$-$CH_2$-O-$CH_2$-CH(OH)-$CH_2$-OH
lubricant B, formula (2):
HO-$CH_2$- $CF_2$-(O-$C_2F_4$)p-(O-$CF_2$)q-O-$CF_2$-$CH_2$- OH,-- therefor.

Column 13, Lines 54-59, delete
"HO-$CH_2$-CH(OH)-$CH_2$-O-$CH_2$-$CF_2$-(O-$C_2F_4$)p-(O-$CF_2$)q-O-$CF_2$-$CH_2$-O-$CH_2$-CH(OH)-$CH_2$-OH
lubricant A, formula (1):
HO-$CH_2$- $CF_2$-(O-$C_2F_4$)p-(O-$CF_2$)q-O-$CF_2$-$CH_2$- OH,
lubricant B, formula (2):" and insert
--lubricant A, formula (1):
HO-$CH_2$-CH(OH)-$CH_2$-O-$CH_2$-$CF_2$-(O-$C_2F_4$)p-(O-$CF_2$)q-O-$CF_2$-$CH_2$-O-$CH_2$-CH(OH)-$CH_2$-OH
lubricant B, formula (2):
HO-$CH_2$- $CF_2$-(O-$C_2F_4$)p-(O-$CF_2$)q-O-$CF_2$-$CH_2$- OH,-- therefor.

Column 14, Line 32, after "vessel" delete "held".

UNITED STATES PATENT AND TRADEMARK OFFICE
CERTIFICATE OF CORRECTION

PATENT NO. : 6,911,420 B2
APPLICATION NO. : 10/279037
DATED : June 28, 2005
INVENTOR(S) : Yoshihito Osawa et al.

It is certified that error appears in the above-identified patent and that said Letters Patent is hereby corrected as shown below:

Column 14, Lines 45-51, delete
"$HO-CH_2-CH(OH)-CH_2-O-CH_2-CF_2-(O-C_2F_4)p-(O-CF_2)q-O-CF_2-CH_2-O-CH_2-CH(OH)-CH_2-OH$
lubricant A, formula (1):
$HO-CH_2- CF_2-(O-C_2F_4)p-(O-CF_2)q-O-CF_2-CH_2- OH$,
lubricant B, formula (2):" and insert
--lubricant A, formula (1):
$HO-CH_2-CH(OH)-CH_2-O-CH_2-CF_2-(O-C_2F_4)p-(O-CF_2)q-O-CF_2-CH_2-O-CH_2-CH(OH)-CH_2-OH$
lubricant B, formula (2):
$HO-CH_2- CF_2-(O-C_2F_4)p-(O-CF_2)q-O-CF_2-CH_2- OH$,-- therefor.

Signed and Sealed this

Ninth Day of January, 2007

JON W. DUDAS
*Director of the United States Patent and Trademark Office*